United States Patent
Kusanagi (10) Patent No.: US 6,595,558 B2
(45) Date of Patent: Jul. 22, 2003

(54) HIGH-PRESSURE METAL PIPE WITH CONNECTION HEAD, METHOD OF FORMING THE HEAD AND CONNECTION WASHER FOR THE CONNECTION HEAD

(75) Inventor: Ryuichi Kusanagi, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/866,127

(22) Filed: May 25, 2001

(65) Prior Publication Data

US 2002/0005642 A1 Jan. 17, 2002

(30) Foreign Application Priority Data

May 29, 2000  (JP) .......................................... 2000-158247

(51) Int. Cl.⁷ ................................................ F16L 19/04
(52) U.S. Cl. ........................................ 285/382; 411/531
(58) Field of Search ........................... 285/382; 411/531, 411/546

(56) References Cited

U.S. PATENT DOCUMENTS

| | | | | |
|---|---|---|---|---|
| 2,689,146 A | * | 9/1954 | Werner | 285/382 |
| 3,761,114 A | * | 9/1973 | Blakeley | 285/382 |
| 4,621,842 A | * | 11/1986 | Kowal et al. | 285/382 |
| 4,681,352 A | * | 7/1987 | Sundholm | 285/382 |
| 4,867,484 A | * | 9/1989 | Guest | 285/382 |
| 5,402,829 A | | 4/1995 | Takikawa et al. | |
| 5,529,349 A | * | 6/1996 | Gibbs et al. | 285/382 |
| 5,533,765 A | * | 7/1996 | Williamson et al. | 285/382 |
| 5,732,985 A | * | 3/1998 | Suzuki | 285/382 |
| 5,903,964 A | | 5/1999 | Uematsu et al. | |
| 5,957,507 A | | 9/1999 | Asada | |
| 5,979,945 A | | 11/1999 | Hitachi et al. | |
| 5,992,904 A | | 11/1999 | Hitachi et al. | |
| 6,045,162 A | | 4/2000 | Haibara | |
| 6,050,611 A | | 4/2000 | Asada | |
| 6,367,850 B1 | * | 4/2002 | Thrift et al. | 285/382 |

* cited by examiner

Primary Examiner—Lynne H. Browne
Assistant Examiner—James M. Hewitt
(74) Attorney, Agent, or Firm—Anthony J. Carella; Gerald E Hespos (57) ABSTRACT

A connection head at a connection end of a thick wall steel pipe has an outer end face formed as a truncated cone or a truncated sphere. A lower neck portion is formed at the rear of the connection head and has a cylindrical outer surface and a taper to the outer surface of the pipe. A connection washer covers the lower neck portion of the connection head. A shallow gently sloping annular groove is produced inside the connection head as a result of a press forming. The above structure can prevent fatigue fracture due to stress concentration at the annular groove inside the head and sticking of a nut to the washer due to excessive tightening torque.

5 Claims, 6 Drawing Sheets

HIGH-PRESSURE METAL PIPE WITH CONNECTION HEAD, METHOD OF FORMING THE HEAD AND CONNECTION WASHER FOR THE CONNECTION HEAD

BACKGROUND OF THE INVENTION

1. Field of the Invention

The present invention relates to a high-pressure metal pipe with a connection head of a thick wall steel pipe with a relatively small diameter such as a high pressure fuel injection pipe having an outer diameter of the order of 4 mm to 20 mm and a wall thickness of the order of 1 mm to 8 mm frequently used for being arranged as a fuel supply piping in a diesel internal combustion engine. The present invention also relates to a method of forming the connection head and a connection washer for the connection head.

2. Description of the Prior Art

Figure 1:
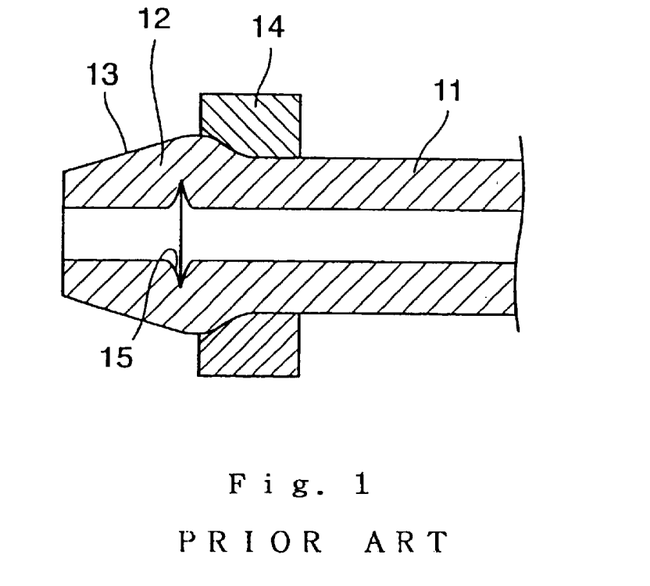
FIG. 1 is a vertical cross sectional view showing an example of a high pressure metal pipe formed by a conventional forming method.
Figure 2:
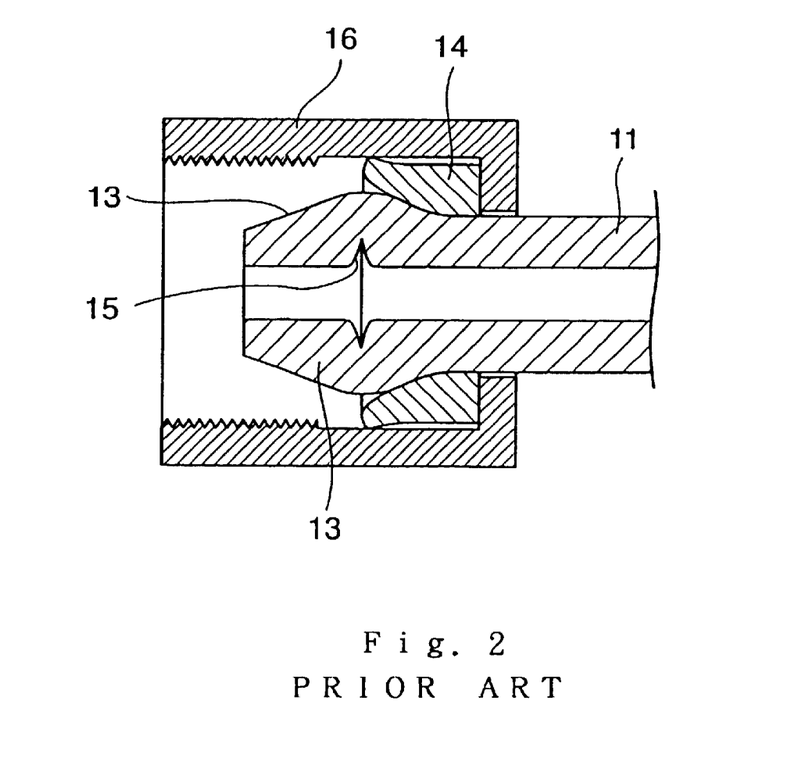
FIG. 2 is a vertical cross sectional view showing an example of a sticking phenomenon of a nut to a washer due to excessive tightening torque in the high-pressure metal pipe shown in FIG. 1.

A conventional high-pressure metal pipe with a connection head of such a kind and a method of forming the head thereof are presented as an example shown in FIG. 1 and FIG. 2. In the example, an end portion of a thick wall steel pipe 11 is externally pressed in its axial direction by a punching die. This makes the end portion subjected to buckling to be press-formed into a flat-head-cone-like connection head 12 with the outer surface of the pipe 11 being provided as a seat surface 13 of the connection head 12. Outward expansion of the pipe wall in relation to the press forming with the buckling produces a deep and large annular sharp fold 15 or a pocket on the inner surface of the head. With such a state, thus constituted connection head is provided for being used at present. In addition, a washer 14 is fitted onto a lower neck portion of the connection head 12.

In such a conventional high pressure metal pipe with a connection head and a manufacturing method thereof, however, there was presented a problem in which the deep and large annular sharp fold 15 or a pocket produced on the inside the head becomes a possible start point of fatigue fracture due to repetitive high pressure imposed by high pressure fluid in the pipe when the pipe is arranged and used.

Moreover, as shown in FIG. 2, when a box nut 16 used in connecting the pipe to another one is excessively tightened without controlling tightening torque, the washer 14 was subjected to plastic deformation to be broken as shown in the figure. The tightening torque produces a force acting in an axial direction. At a top end portion of the washer 14, the force is divided into a component along the inclined seat surface 13 and a component vertically acting on the seat surface 13, of which a force resisting the tightening is a reaction against the component vertically acting the seat surface 13. Most of the reaction acts in a direction of the wall thickness of the pipe at the top end portion of the washer 14, by which the washer 14 is radially expanded in the diameter for being deformed to be broken. This causes a problem that makes the top end of the washer 14 bite into the inner surface of the box nut 16 to make it stick to the washer 14.

SUMMARY OF THE INVENTION

The present invention is made in view of the above problem in the prior art with an object of providing a high-pressure metal pipe with a connection head, a method of forming the connection head thereof and a connection washer for the connection head, in which, instead of the annular sharp fold or pocket, an annular groove can be formed on an inside face of the head as being shallow and having a gently sloping cross sectional outline form when forming the head to make it possible to eliminate fear of causing fatigue fracture inside the head and to prevent the nut from being stuck to the washer due to an excessive tightening torque.

In order to achieve the above object, the gist of the present invention is a high-pressure metal pipe with a connection head characterized by comprising a connection head provided at an connection end of a thick wall steel pipe with a relatively small diameter and a connection washer covering an outer surface of a lower neck portion of the connection head. The connection head has an outer face being provided as a flat-head-cone-like or flat-head-sphere-like seat surface for being fitted to a mating seat, and an inside face having a shallow and gently sloping annular groove produced as a result of deformation due to a press forming of the head. The connection washer has a step expanded diameter section at one end with a face perpendicular or inclined in cone-like to an axis of the washer, and a maximum diameter portion of the connection head is formed over the face of the one end with the step expanded diameter section, with a part of the connection head filling the step expanded diameter section.

Moreover, a method of forming a head of a high-pressure metal pipe is characterized by comprising the steps of providing a thick wall steel pipe with a relatively small diameter being cut for a specified length beforehand; providing a connection washer; preparing a chuck for holding the steel pipe together with the washer; preparing a punching machine having a die for forming the head of the high-pressure metal pipe; forming a step expanded diameter section at one end of the connection washer; fitting the connection washer near a connection end of the thick wall steel pipe onto outside thereof in coaxial so that the step expanded diameter section is on the connection end side; making the chuck hold the steel pipe together with the connection washer with a margin for forming the connection head being left on a top end side from the connection washer; and externally pressing the top end section of the steel pipe by the die of the punching machine in coaxial to form the connection head with the outer surface of the steel pipe being provided as a flat-head-cone-like or flat-head-sphere-like seat surface for being fitted to a mating seat so that the inside face of the connection head is formed to have a shallow and gently sloping annular groove, the connection washer covers an outer surface of a lower neck portion of the connection head, and a maximum diameter portion of the connection head is formed over the face of the one end of the washer with the step expanded diameter section with a part of the steel pipe filling the step expanded diameter section.

The method further comprises the step of forming the face of the one end of the connection washer with the step expanded diameter section as being perpendicular or inclined in cone-like to an axis of the washer.

In addition, the connection washer is characterized by providing at one end a step expanded diameter section covering an outer surface of a lower neck portion of the connection head of a high pressure metal pipe.

In the present invention, the step expanded diameter section is provided at one end of the washer covering an outer surface of the lower neck portion of the connection head. Thus, the step expanded diameter section functions to restrain outward expansion of the outer diameter of the molded portion for bringing the tube material to project toward inside to provide the shallow annular groove having a gently sloping cross sectional outline form instead of forming the annular groove as a sharp fold or pocket.

Therefore, the possibility of the annular groove becoming a start point of fatigue fracture can be reduced which is due to stress concentration inside the head. Here, the connection washer refers to a washer or a sleeve washer.

Moreover, the structure, in which the maximum diameter portion of the connection head is over the face of the one end of the connection washer with the step expanded diameter section which face is formed as being perpendicular or inclined in cone-like to an axis of the washer, can prevent the nut from being stuck to the washer deformed to radially expand due to excessive tightening torque given to the nut. The structure provides the contact surface of the maximum diameter portion with the end face of the washer as also being perpendicular or inclined in cone-like to the axis. Thus, a reaction to a force, produced by the excessive tightening torque and acting on the contact surface in an axial direction, is made to act also in the axial direction or toward inside the washer. Therefore, no component acting in the direction of the wall thickness of the washer is generated to make it possible to restrain the radial expansion of the washer and to prevent the nut from causing a phenomenon of being stuck to the deformed washer.

In addition to the above working-effect, when the meeting face of the connection washer with the tightening nut is provided as a spherical face, an effect can be also obtained that can uniformly transmit the force acting in the axial direction onto the seat surface without losing the force even if there is a deviation between the axes of the washer and the nut.

DETAILED DESCRIPTION OF THE PREFERRED EMBODIMENTS

Embodiments of the present invention will be explained below with reference to FIG. 3 to FIG. 12. In the figures, reference numeral 1 designates a thick wall steel pipe, reference numerals 2a to 2f and 2h designate washers, reference numeral 2g designates a sleeve washer, reference numerals 4-1 to 4-3 designate connection heads, reference numerals 5a and 5b designate annular grooves, reference numeral 6 designates a chuck and reference numeral 7 designates a punching die, respectively.

The thick wall steel pipe 1 is of a thick wall pipe with a relatively small diameter having a diameter of the order of 4 mm to 20 mm and a wall thickness of the order of 1 mm to 8 mm, which is made of carbon steel material for high-pressure pipe use being cut into a specified length beforehand.

In a method of forming the head of the high-pressure metal pipe shown in FIG. 3, the washer 2a is fitted onto the thick wall steel pipe 1 beforehand near a portion to be formed into the connection head later with a margin for forming the connection head being left on a top end side. The washer 2a has a cylinder-like section covering the portion to be formed into the connection head and a step expanded diameter section 2a-1 formed inside of an end on a side on which the head is formed. The end on the side of forming the head is formed perpendicularly to the axes of the washer 2a and the steel tube 1. The step expanded diameter section 2a-1 comprises a large diameter aperture section 2a-11 and a tapered face 2a-12. The large diameter aperture section 2a-11 is formed on the side of forming the head over a length ranging from about 1/20 to 1/2 of the axial length of the washer. The tapered face 2a-12 connects an inner face of the large diameter aperture section 2a-11 and an inner face of the washer and expands toward the side of forming the head. Therefore, when the washer 2a having such a cross sectional shape is fitted onto the thick wall steel pipe 1, there is provided an annular space 2a-13 formed between an inner surface of the large diameter aperture section 2a-11 of the step expanded diameter section 2a-1 and the outer surface of the thick wall steel pipe 1 as shown in FIG. 3.

Subsequent to this, with the washer 2a and the thick wall steel pipe 1 in the above state being held in the chuck 6, the top portion of the steel pipe 1 is pressed in the axial direction by the punching die 7 that is provided with a mold of the head having a flat-head-cone-like seat surface. This makes the margin portion for forming the head of the thick wall steel pipe 1 subjected to plastic deformation to be formed into a flat-head-cone-like seat surface 4-1a. Along with this, the margin portion subjected to the plastic deformation fills the space 2*a*-13 of the washer 2*a* fitted onto the thick wall steel pipe 1 beforehand. Thus, the connection head 4-1 is formed. At the same time, a maximum diameter portion of the connection head 4-1 is provided over the face of the one end of the washer 2*a* with the step expanded diameter section. Thus, as shown in FIG. 4, a connection head 4-1 is obtained in which the washer 2*a* covers an outer surface of a lower neck portion of the connection head 4-1 and the flat-head-cone-like seat surface 4-1*a* is provided at the top end portion of the thick wall steel pipe 1 for being fitted to a mating seat (not shown).

In the embodiment, the step expanded diameter section 2*a*-1 of the washer 2*a* functions to restrain outward expansion of the outer diameter of the molded portion when forming the head. This provides the annular groove 5*a*, which is formed on an inside face of the head by outward expansion of the pipe wall due to buckling caused by a press-forming with a punching die 7, as being shallow and having a gently sloping cross sectional outline form. Furthermore, the maximum diameter portion of the connection head 4-1 is provided as being in a state of being over the face of the one end of the washer 2*a*.

Figure 3:
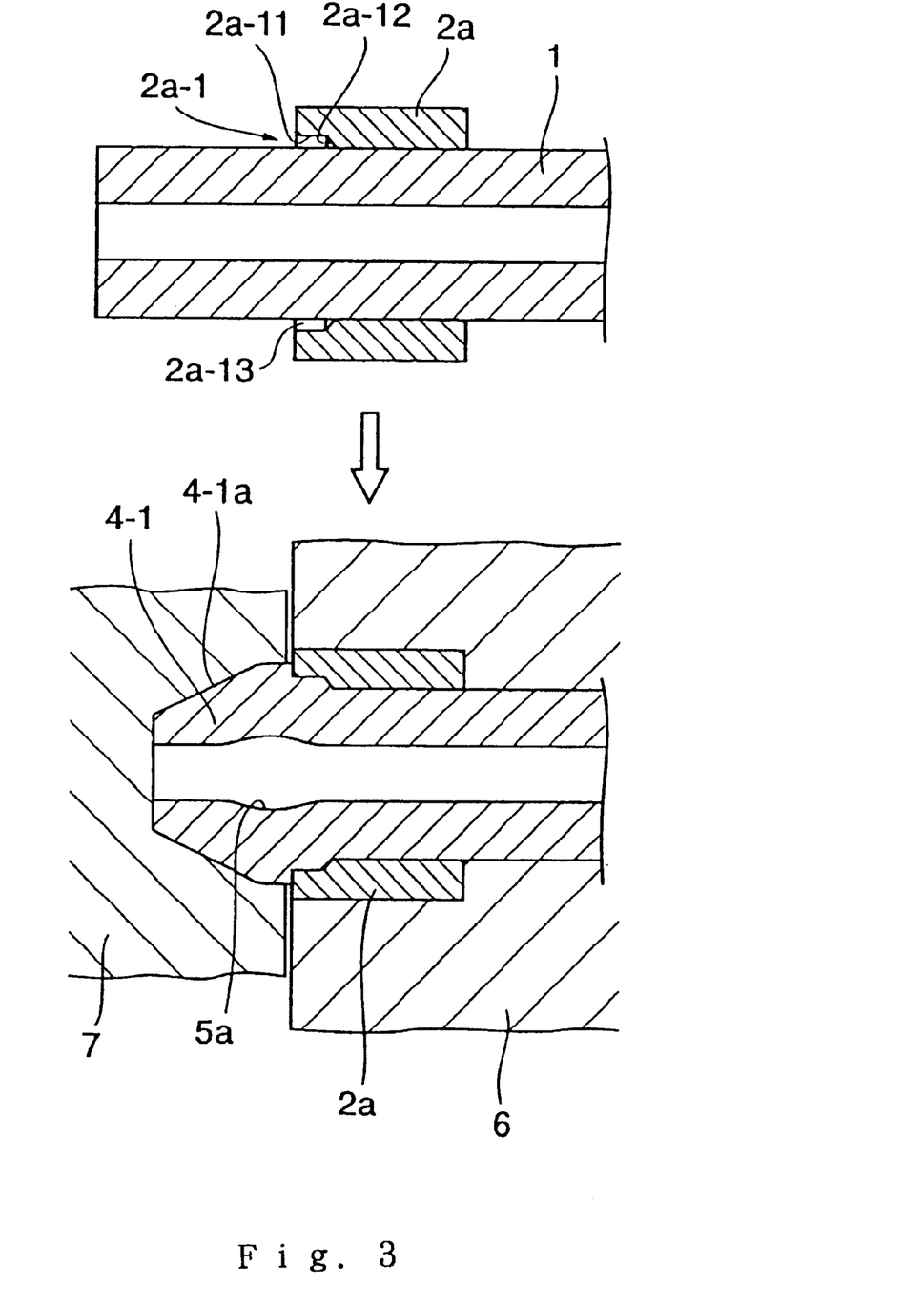
FIG. 3 is a vertical cross sectional view explanatorily showing an embodiment of a high pressure metal pipe with a connection head together with a forming process relating to a method of forming the head according to the present invention.
Figure 5:
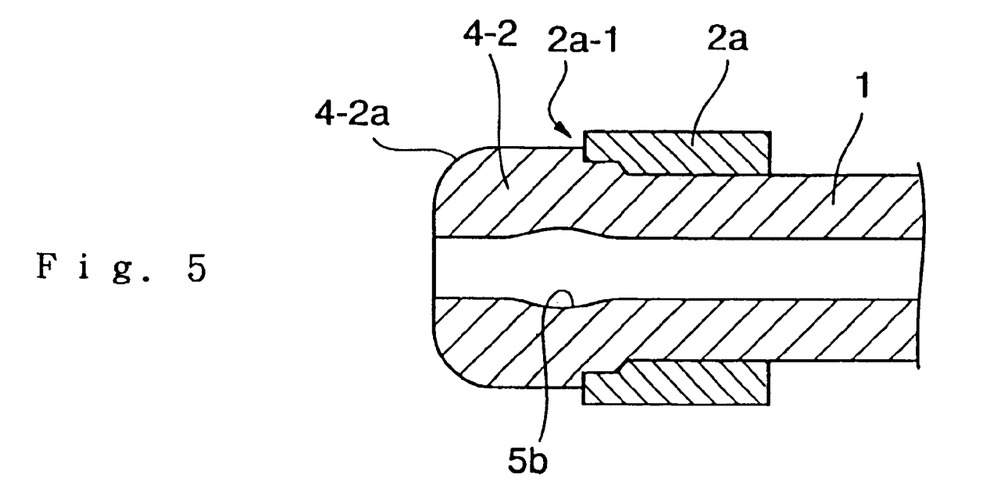
FIG. 5 is a vertical cross sectional view showing another embodiment of the high pressure metal pipe formed by the method according to the present invention.

FIG. 5 is a cross sectional view showing another embodiment of the high-pressure metal pipe obtained by the method shown in FIG. 3. In the high-pressure metal pipe shown in FIG. 5, the washer 2*a* shown in the above FIG. 3 is fitted onto the thick wall steel pipe 1 beforehand to be fixed near a portion to be formed into the connection head later with a margin for forming the connection head being left on the top end side. Then, the top end portion of the steel pipe 1 is externally pressed in the axial direction by the press with a punching die that is provided with a mold of the head having a flat-head-sphere-like seat surface. This press forming provides a connection head 4-2 which has an outer surface being provided as a flat-head-sphere-like seat surface 4-2*a* for being fitted to a mating seat and an annular groove 5*b* formed on an inside face as being shallow and having a gently sloping cross sectional outline form. Along with this, a structure is provided in which the maximum diameter portion of the connection head 4-1 is over the face of the one end of the washer 2*a* and the cylindrical section of the washer 2*a* covers an outer surface of a lower neck portion of the connection head 4-2.

Figure 4:
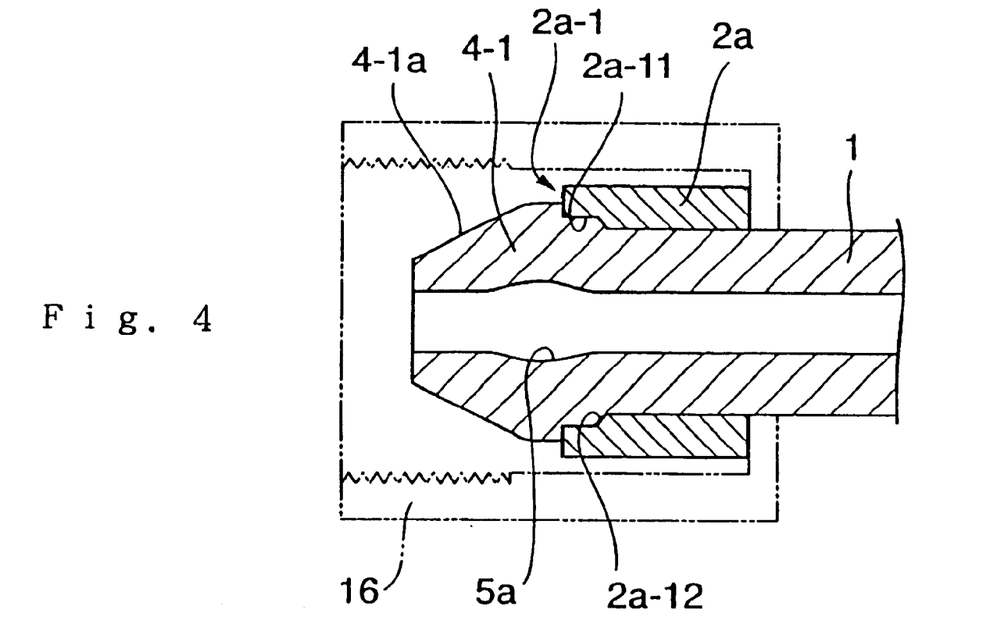
FIG. 4 is a vertical cross sectional view showing the embodiment of the high pressure metal pipe formed by the method of forming the head shown in FIG. 3.

In the case of the high-pressure metal pipe with the connection head having the structure as shown in FIG. 4 or FIG. 5, an annular groove 5*a* or 5*b* formed on the inside surface of the connection head 4-1 or 4-2 is made as being shallow and having a gently sloping cross sectional outline form. Therefore, the annular groove 5*a* or 5*b* has little possibility of becoming a start point of fatigue fracture due to stress concentration inside the head.

Moreover, when the box nut 16 used in connecting the pipe to another one is excessively tightened without controlling tightening torque, a force produced by the excessive tightening torque and acting in the axial direction of the pipe is exerted to the connection head 4-1 or 4-2 on a contact surface of the maximum diameter portion thereof with the end face of the washer 2*a* on the step expanded diameter section side. Since the contact surface is formed perpendicularly to the axis, the reaction to the exerted force in the axial direction acts also in the axial direction to generate no component acting in the direction of the wall thickness of the washer 2*a*. Thus, the radial expansion of the washer 2*a* can be restrained. This can solve the problem arisen in the conventional connection head as shown in FIG. 1 such that the force acting in the axial direction causes the washer 14 to be subjected to plastic deformation to be broken for making its top end bite into the inner surface of the box nut 16 to cause it to stick to the washer 14.

Figure 6:
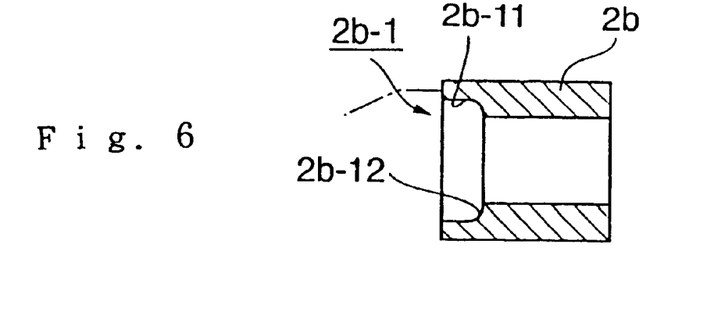
FIG. 6 is a vertical cross sectional view showing an embodiment of the washer according to the present invention having a different cross sectional form of a step expanded diameter section.
Figure 7:
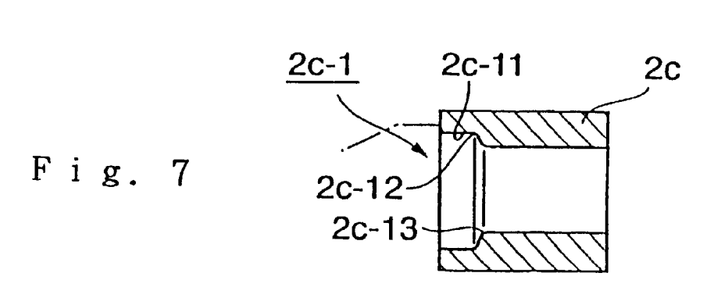
FIG. 7 is a vertical cross sectional view showing another embodiment of the washer according to the present invention having another different cross sectional form of a step expanded diameter section.

In the next, various embodiments of washers will be explained on the basis of FIG. 6 to FIG. 9, each with a different cross sectional shape of a step expanded diameter section. In each of a washer 2*b* and a washer 2*c* respectively shown in FIG. 6 and FIG. 7, a step between an inner face of a step expanded diameter section and an inner face of the washer is connected by a smooth curved face. FIG. 6 is a cross sectional view showing the washer 2*b*, in which an inner face of a large diameter aperture section 2*b*-11 of a step expanded diameter section 2*b*-1 and the inner face of the washer 2*b* is connected by a smooth curved face 2*b*-12. FIG. 7 is a cross sectional view showing a washer 2*c*, in which an inner face of a large diameter aperture section 2*c*-11 of a step expanded diameter section 2*c*-1 and the inner face of the washer 2*c* is connected by an annular concave face 2*c*-12 and an annular convex face 2*c*-13, each having a smooth curved face.

Figure 8:
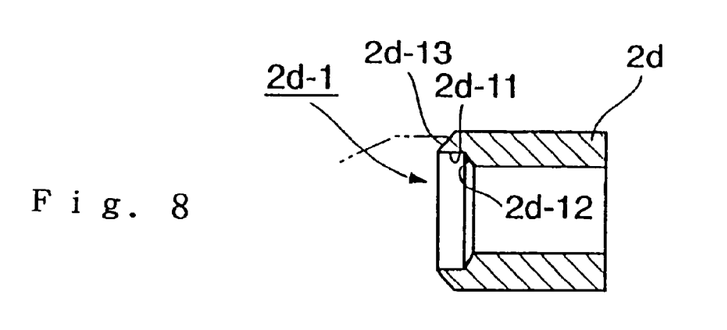
FIG. 8 is a vertical cross sectional view showing another embodiment of the washer according to the present invention having further different cross sectional form of a step expanded diameter section.
Figure 9:
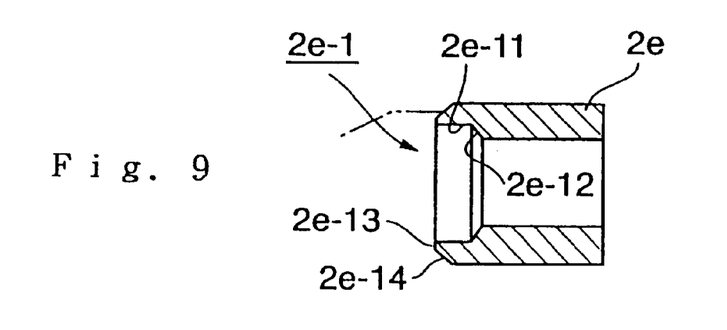
FIG. 9 is a vertical cross sectional view showing another embodiment of the washer according to the present invention having still different cross sectional form of a step expanded diameter section.

Each of washers 2*d* and 2*e* respectively shown in FIG. 8 and FIG. 9 has an end face formed in cone-like for further restricting radial expansion of the washer when tightening a nut. The washer 2*d* shown in FIG. 8 has an end face 2*d*-13 made inclined to be formed in cone-like on the side of an aperture of a step expanded diameter section 2*d*-1 comprising a large diameter aperture section 2*d*-11 and a tapered face 2*d*-12. The washer 2*e* shown in FIG. 9 has an end face formed with a face 2*e*-13 perpendicular to the axis of the washer and an inclined face 2*e*-14 connecting the face 2*e*-13 and the outer surface of the washer on the side of an aperture of a step expanded diameter section 2*e*-1 comprising a large diameter aperture section 2*e*-11 and a tapered face 2*e*-12.

In each of the washers 2*d* and 2*e* shown in FIG. 8 and FIG. 9, respectively, a force produced by the excessive tightening torque and acting in the axial direction is exerted on an inclined contact surface of the inclined face 2*d*-13 or 2*e*-14 with the maximum diameter portion of the connection head. Thus, a reaction to the above force acts perpendicularly to the inclined face 2*d*-13 or 2*e*-14, that is, acts toward inside the washer 2*d* or 2*e* to enhance the effect of restricting radial expansion of the washer without producing any component for expanding the washer 2*d* or 2*e*.

Therefore, in the washers 2*b* to 2*e* shown in FIG. 6 to FIG. 9, respectively, the same effects as in the washer 2*a* shown in FIG. 3. can be of course obtained.

Figure 10:
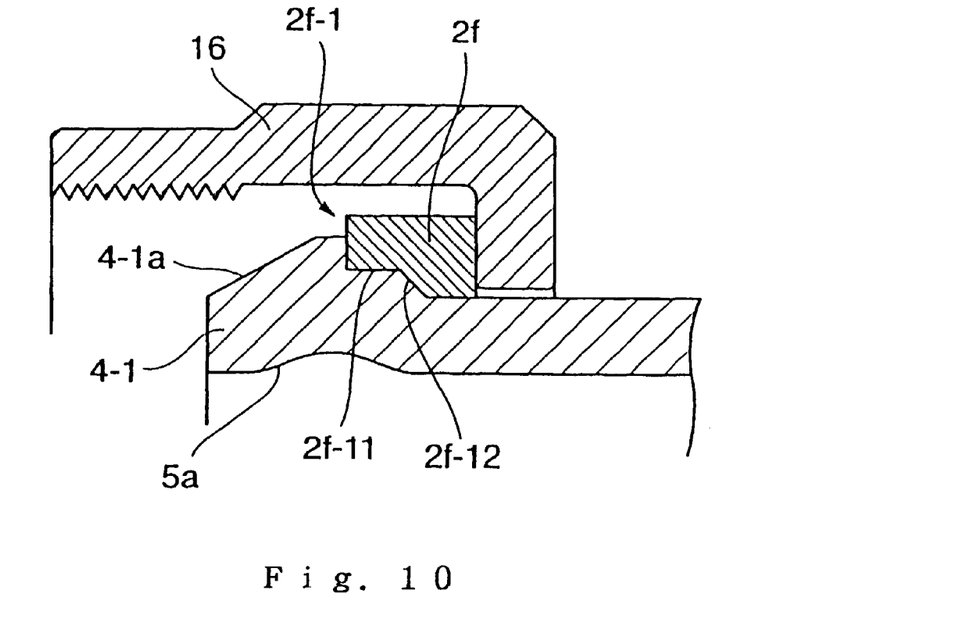
FIG. 10 is a partial vertical cross sectional view showing a connection head of a high pressure metal pipe using another kind of washer according to the present invention having another different cross sectional form of a step expanded diameter section.

FIG. 10 shows a case of using a washer 2*f* with a little shorter length compared with those of the washers 2*a* to 2*e* respectively shown in FIG. 3 to FIG. 9. Also in this case, a step expanded diameter section 2*f*-1 of the washer 2*f*, comprising a large diameter aperture section 2*f*-11 and a tapered face 2*f*-12, functions to restrain outward expansion of the outer diameter of the molded portion when forming the head by the method shown in FIG. 3. This provides the annular groove 5*a*, which is formed on an inside face of the head by outward expansion of the pipe wall due to buckling caused by a press-forming with a punching die, as being shallow and having a gently sloping cross sectional outline form. Furthermore, the maximum diameter portion of the connection head 4-1 is provided as being in a state of being over the face of the one end of the washer 2*f*.

Also in the case of the high-pressure metal pipe with the connection head having the structure as shown in FIG. 10, the annular groove 5*a* formed on the inside surface of the connection head 4-1 is made as being shallow and having a gently sloping cross sectional outline form. Therefore, the annular groove 5*a* has little possibility of becoming a start point of fatigue fracture due to stress concentration inside the head. Moreover, when the box nut 16 used in connecting the pipe to another one is excessively tightened without controlling tightening torque, a force produced by the excessive tightening torque and acting in an axial direction of the pipe is exerted to the connection head 4-1 on a contact surface of the maximum diameter portion thereof with the end face of the washer 2f on the step expanded diameter section side. Since the contact surface is formed perpendicularly to the axis, the reaction to the exerted force in the axial direction acts also in the axial direction to generate no component acting in the direction of the wall thickness of the washer 2f. Thus, the radial expansion of the washer 2a can be restrained. Therefore, there occurs no such plastic deformation of the washer 2f due to the force acting in the radial direction as to make the top end of the washer 2f bite into the inner surface of the box nut 16 to cause it to stick to the washer 2f.

Figure 11:
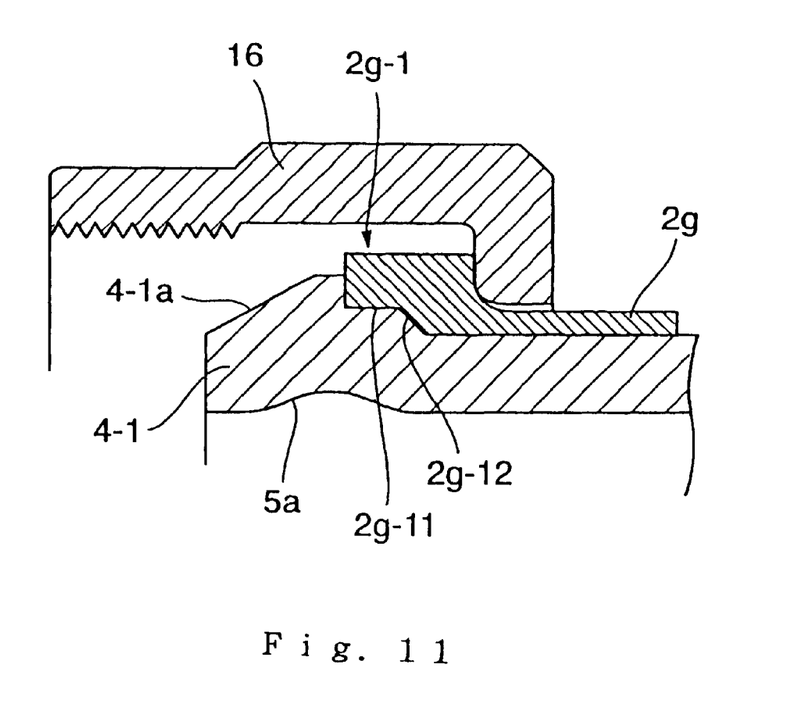
FIG. 11 is a partial vertical cross sectional view showing a connection head of a high pressure metal pipe using a sleeve washer as further another kind according to the present invention having further another different cross sectional form of a step expanded diameter section.

FIG. 11 shows a case of using a washer with a longer axial length than that of the above washer, that is, a sleeve washer 2g. Also in this case, a step expanded diameter section 2g-1 of the sleeve washer 2g, comprising a large diameter aperture section 2g-11 and a tapered face 2g-12, functions to restrain outward expansion of the outer diameter of the molded portion when forming the head by the method shown in FIG. 3. This provides the annular groove 5a, which is formed on an inside face of the head by outward expansion of the pipe wall due to buckling caused by a press-forming with a punching die, as being shallow and having a gently sloping cross sectional outline form. Furthermore, the maximum diameter portion of the connection head 4-1 is provided as being in a state of being over the face of the one end of the sleeve washer 2g.

Also in the case of the high-pressure metal pipe with the connection head having the structure as shown in FIG. 11, the annular groove 5a formed on the inside surface of the connection head 4-1 is made as being shallow and having a gently sloping cross sectional outline form. Therefore, the annular groove 5a has little possibility of becoming a start point of fatigue fracture due to stress concentration inside the head. Moreover, when the box nut 16 used in connecting the pipe to another one is excessively tightened without controlling tightening torque, a force produced by the excessive tightening torque and acting in an axial direction of the pipe is exerted to the connection head 4-1 on a contact surface of the maximum diameter portion thereof with the end face of the sleeve washer 2g on the step expanded diameter section side. Since the contact surface is formed perpendicularly to the axis, the reaction to the exerted force in the axial direction acts also in the axial direction to generate no component acting in the direction of the wall thickness of the sleeve washer 2g. Thus, the radial expansion of the sleeve washer 2g can be restrained. Therefore, there occurs no such plastic deformation of the sleeve washer 2g due to the force acting in the radial direction as to make the top end of the sleeve washer 2g bite into the inner surface of the box nut 16 to cause it to stick to the sleeve washer 2g. Furthermore, meeting faces of the sleeve washer 2g and the box nut 16 are formed in a concave spherical face and a convex spherical face, respectively. This provides a spherical contact between them, which can correct any mutual deviation between the respective axes. Therefore, an effect is obtained by which the force acting in the axial direction can be uniformly transmitted onto the seat surface 4-1a without any loss.

Figure 12:
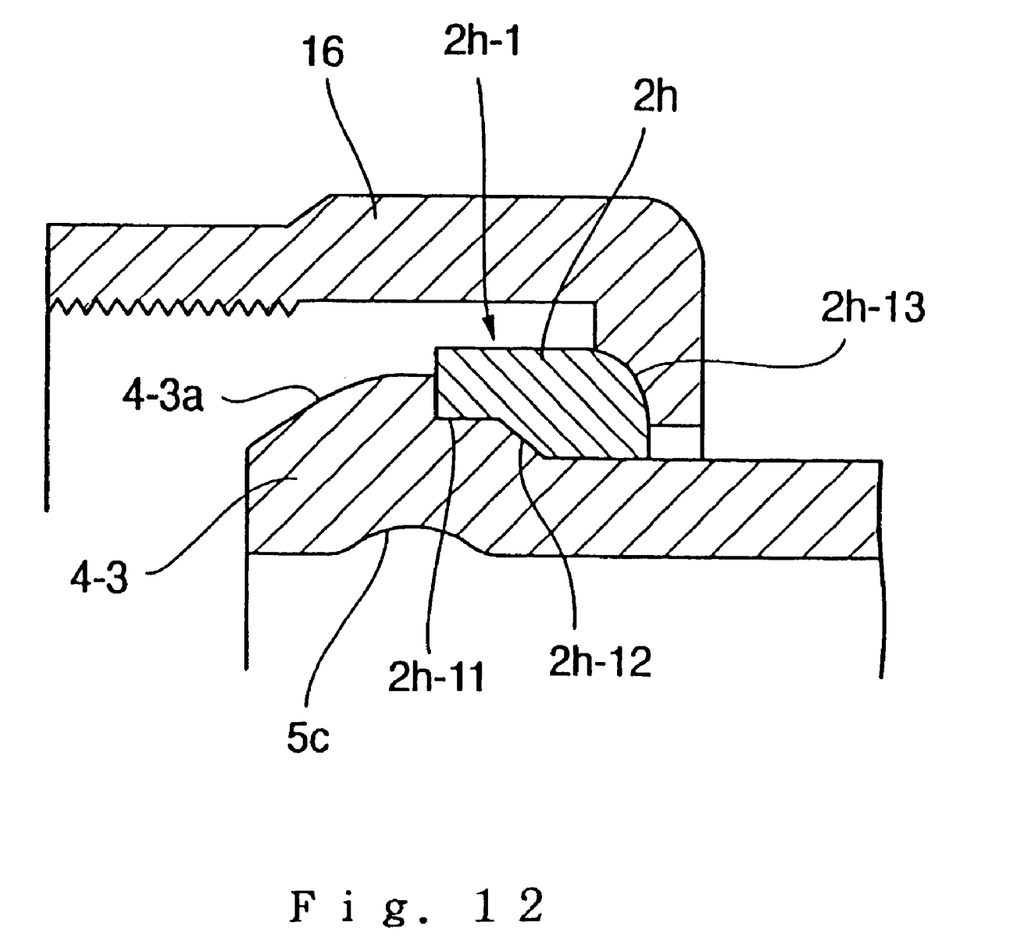
FIG. 12 is a partial vertical cross sectional view showing a connection head of a high pressure metal pipe using a connection washer as further another kind according to the present invention with a meeting face with a tightening nut formed in a spherical surface.

FIG. 12 shows a case of using a connection washer having a meeting face with a tightening nut made as a spherical surface. In this case, a convex meeting face of a washer 2h, which covers a lower neck portion of a connection head 4-3 having an outer surface being provided as a flat-head-sphere-like seat surface 4-3a, is formed in a spherical face 2h-13 to make the washer 2h provide a spherical contact with a concave spherical surface of the box nut 16. Also in this case, a step expanded diameter section 2h-1 of the washer 2h, comprising a large diameter aperture section 2h-11 and a tapered face 2h-12, functions to restrain outward expansion of the outer diameter of the molded portion when forming the head by the method shown in FIG. 3. This provides an annular groove 5c, which is formed on an inside face of the head by outward expansion of the pipe wall due to buckling caused by a press-forming with a punching die, as being shallow and having a gently sloping cross sectional outline form. Therefore, the annular groove 5c has little possibility of becoming a start point of fatigue fracture due to stress concentration inside the head.

Moreover, the maximum diameter portion of the connection head 4-3 is provided as being in a state of being over the face of the one end of the washer 2h formed perpendicularly to its axis. Therefore, when the box nut 16 used in connecting the pipe to another one is excessively tightened without controlling tightening torque, a force produced by the excessive tightening torque and acting in the axial direction of the pipe is exerted to the connection head 4-3 on a contact surface of the maximum diameter portion thereof with the end face of the washer 2h on the step expanded diameter section side. Since the contact surface is formed perpendicularly to the axis, the reaction to the exerted force in the axial direction acts also in the axial direction to generate no component acting in the direction of the wall thickness of the washer 2h. Thus, the radial expansion of the washer 2h can be restrained. Therefore, there occurs no such plastic deformation of the sleeve washer 2h due to the force acting in the radial direction as to make the top end of the sleeve washer 2h bite into the inner surface of the box nut 16 to cause it to stick to the washer 2h.

Furthermore, a spherical contact of the convex spherical face 2h-13 of the washer 2h with the concave spherical phase of the box nut 16 functions to correct any subtle mutual angular deviation between the respective axes. Therefore, an effect is obtained by which the force acting in the axial direction can be uniformly transmitted onto the seat surface 4-3a without any loss. In addition, the meeting face of the nut is preferably provided as being a spherical face with a radius of curvature larger than that of the spherical face 2h-13 of the washer 2h or a cone-like tapered face for better exhibiting its corrective action of angular deviation between the axes of the washer 2h and the nut.

As explained in the foregoing, in the high-pressure metal pipe with a connection head and the method of forming the head thereof, the step expanded diameter section is provided in the connection washer (a washer or a sleeve washer) covering the outer surface of the lower neck portion of the connection head. Thus, the step expanded diameter section functions to restrain outward expansion of the outer diameter of the molded portion for bringing the pipe material to project toward inside. This allows the annular groove to be provided as being shallow and having a gently sloping cross sectional outline form instead of being formed as a sharp fold or pocket. Therefore, fatigue fracture due to stress concentration inside the head can be prevented. Moreover, the structure in which the connection head is over the end face of the connection washer perpendicular to the axis thereof can restrain radial expansion of the connection washer. This produces an excellent effect of preventing the nut from causing a phenomenon of being stuck to the deformed washer even when the nut is excessively tightened without controlling tightening torque.

What is claimed is:

1. A pipe assembly comprising:

a high-pressure metal pipe having opposite first and second ends and a passage extending therebetween, a connection head at said first end, said connection head having a substantially planar end face aligned substantially perpendicular to said passage, a frustum surface extending out and away from the end face, a maximum diameter outer cylindrical surface extending from an end of the frustum surface remote from the end face, a bearing face extending generally radially in from an end of a maximum diameter outer cylindrical surface remote from the frustum surface, a small diameter outer cylindrical surface extending from the bearing face and away from the end face, and a conically generated surface extending from an end of the small diameter outer cylindrical surface spaced from the bearing face, said metal pipe having an elongate cylindrical surface extending from the conically generated surface and away from the connection head; and a metallic connection washer having opposite first and second ends and a passage extending between said ends, said passage being mounted over the metal pipe, said passage including a large diameter cylindrical surface engaging said small diameter outer cylindrical surface of said connection head, a tapered surface engaging said conically generated surface of said connection head and a small diameter cylindrical surface engaging portions of the elongate cylindrical surface of said metal pipe adjacent said connection head.

2. The pipe assembly of claim 1, wherein the washer has at least one planar end face aligned perpendicular to the passage of the pipe.

3. The pipe assembly of claim 2, wherein the washer has a cylindrical outer surface extending between the ends.

4. The pipe assembly of claim 1, wherein the frustum surface extending out and away from the end face of the connection head is a conically generated surface.

5. The pipe assembly of claim 1, wherein the frustum surface extending out and away from the end face of the connection head is a spherically generated surface.

* * * * *